(12) United States Patent
Lee et al.

(10) Patent No.: US 7,552,506 B2
(45) Date of Patent: Jun. 30, 2009

(54) FILTER ASSEMBLY FOR VACUUM CLEANER

(75) Inventors: Yun-Seok Lee, Changwon-si (KR);
Hoi-Kil Jeong, Changwon-si (KR);
Jae-Geun Lee, Busan (KR)

(73) Assignee: LG Electronics Inc., Seoul (KR)

( * ) Notice: Subject to any disclaimer, the term of this patent is extended or adjusted under 35 U.S.C. 154(b) by 783 days.

(21) Appl. No.: 10/788,296

(22) Filed: Mar. 1, 2004

(65) Prior Publication Data
US 2005/0005390 A1     Jan. 13, 2005

(30) Foreign Application Priority Data
Jul. 9, 2003    (KR) .................. 10-2003-0046281
Jul. 29, 2003   (KR) .................. 10-2003-0052184

(51) Int. Cl.
*A47L 9/12*     (2006.01)
(52) U.S. Cl. .................. 15/347; 15/352; 15/353; 55/510; 55/DIG. 3
(58) Field of Classification Search ............. 15/327.1, 15/327.2, 327.3, 327.4, 327.5, 327.6, 327.7, 15/347, 350–353; 55/510, DIG. 3, 337, 482, 55/486, 487, 498, 492, 521
See application file for complete search history.

(56) References Cited

U.S. PATENT DOCUMENTS

| | | | |
|---|---|---|---|
| 2,784,801 A * | 3/1957 | Lunde .................. | 55/482 |
| 3,189,179 A * | 6/1965 | McMichael ............ | 210/493.1 |
| 3,423,909 A * | 1/1969 | Bennett et al. ......... | 55/498 |
| 3,552,553 A | 1/1971 | Reading | |
| 4,032,457 A * | 6/1977 | Matchett ............... | 55/487 |
| 4,303,426 A * | 12/1981 | Battis ................. | 55/498 |
| 4,314,832 A * | 2/1982 | Fox .................... | 55/482 |
| 4,726,825 A | 2/1988 | Natale | |
| 4,838,903 A | 6/1989 | Thomaides et al. | |
| 5,762,669 A | 6/1998 | Kahlbaugh et al. | |
| 5,972,063 A * | 10/1999 | Dudrey et al. ......... | 55/487 |
| 6,289,553 B1 | 9/2001 | Dyson | |
| 6,341,404 B1 | 1/2002 | Salo et al. | |
| 6,484,350 B2 * | 11/2002 | Yung .................. | 15/327.1 |
| 6,558,453 B2 * | 5/2003 | Sepke et al. .......... | 95/268 |
| 6,913,635 B2 * | 7/2005 | Yoo et al. ............ | 55/DIG. 3 |
| 7,115,150 B2 * | 10/2006 | Johnson et al. ........ | 55/486 |
| 7,135,051 B2 * | 11/2006 | Baldinger et al. ...... | 55/337 |
| RE39,473 E * | 1/2007 | Salo et al. ........... | 15/353 |
| 2002/0095741 A1 * | 7/2002 | Inoue et al. .......... | 15/350 |

(Continued)

FOREIGN PATENT DOCUMENTS

AU    758164    3/2003

(Continued)

*Primary Examiner*—Randall Chin
(74) *Attorney, Agent, or Firm*—KED & Associates, LLP (57) ABSTRACT

A filter assembly for a vacuum cleaner is provided. The filter assembly includes a filter case and a primary filter attached to an outside of the filter case. The primary filter filters out fine dust contained in air from which relatively large dust has been separated. A secondary filter provided in the filter case filters out fine dust remaining in the air after passing through the primary filter. The primary and secondary filters are removeable from the filter case so that dust and dirt accumulated in the filter assembly during the process of filtering the fine dust can be cleaned out, and the filters can be used semi-permanently.

17 Claims, 7 Drawing Sheets

U.S. PATENT DOCUMENTS

| | | |
|---|---|---|
| 2002/0194695 A1 | 12/2002 | Stephens et al. |
| 2003/0084536 A1* | 5/2003 | Yung .......................... 15/351 |
| 2004/0074041 A1* | 4/2004 | Overvaag .................... 15/347 |
| 2004/0093684 A1* | 5/2004 | Park .......................... 15/327.1 |

FOREIGN PATENT DOCUMENTS

| | | |
|---|---|---|
| EP | 0983743 | 3/2000 |
| EP | 1 181 886 A2 | 2/2002 |
| EP | 1323370 | 7/2003 |
| GB | 1 436 391 | 5/1976 |
| JP | 52-079370 | 7/1977 |
| JP | 08-071316 | 3/1996 |
| JP | 2000-167314 | 6/2000 |
| JP | 2001-269297 | 10/2001 |
| JP | 2002-253455 | 9/2002 |
| JP | 2002-331208 | 11/2002 |
| RU | 2 050 825 | 12/1995 |

* cited by examiner

FILTER ASSEMBLY FOR VACUUM CLEANER

BACKGROUND OF THE INVENTION

1. Field of Invention

The present invention relates to a vacuum cleaner, and more particularly, to a vacuum cleaner having an improved inner filter structure for a dust collecting unit thereof.

2. Description of the Prior Art

A vacuum cleaner is an apparatus which sucks air containing foreign materials using a vacuum pressure generated by a vacuum motor installed in a main body of the vacuum cleaner, filters out foreign materials such as the dust and dirt in the main body, and then collects and discharges the dust and dirt.

A cyclonic vacuum cleaner which has recently been widely used is designed to filter out dust and dirt in such a manner that relatively heavy dust and dirt are moved outward by a centrifugal force in air flow swirling at a high speed and collected in a specific dust collecting chamber, whereas fine dust and dirt which are not filtered out by the cyclonic method are filtered by a filter such as a pleated filter.

Figure 1:
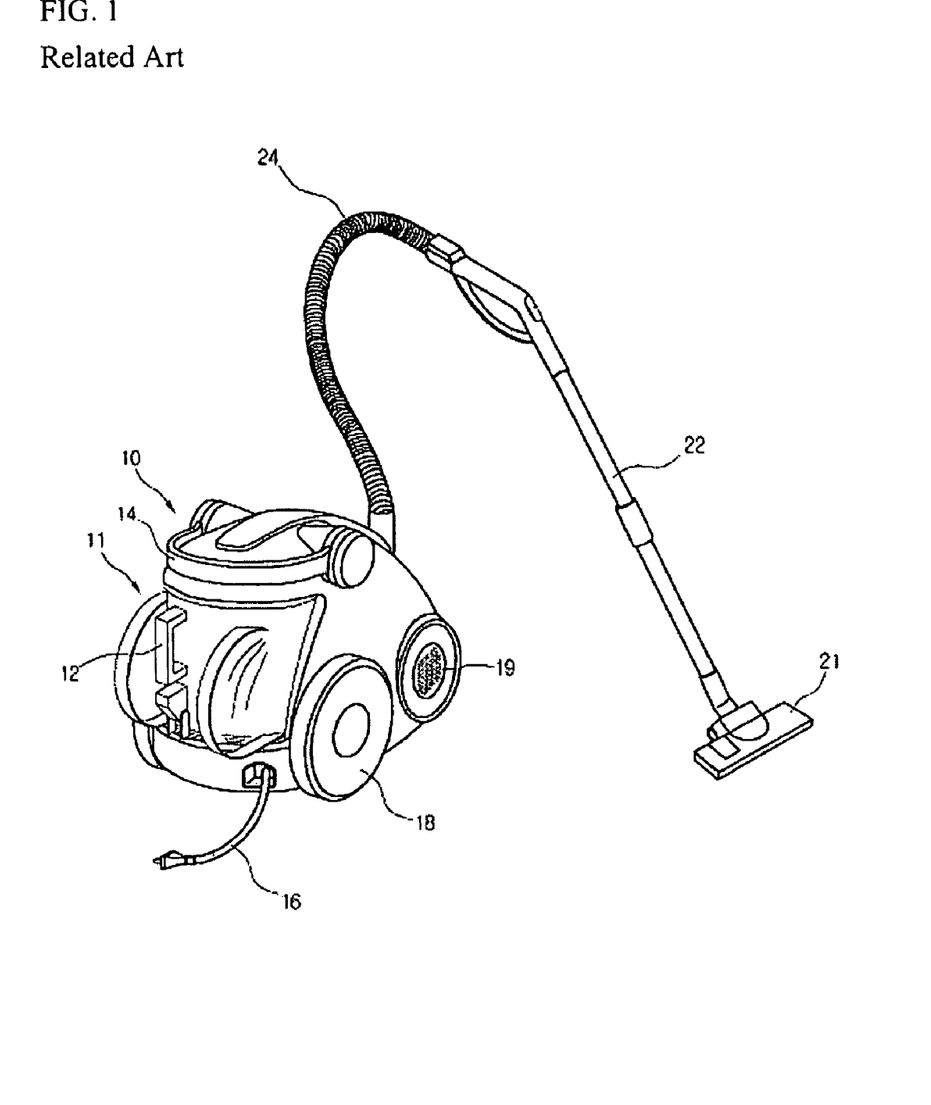
FIG. 1 is a perspective view of a vacuum cleaner for performing a general cyclonic filtering function.

FIG. 1 shows a vacuum cleaner for performing a general cyclonic filtering process.

Referring to FIG. 1, the vacuum cleaner comprises a main body 10 in which a suction means for sucking air in a room is installed, a flexible connection tube 24 which is connected to the main body 10 to communicate with the interior of the main body, a variable length extension tube 22 which is connected to an end of the connection tube 24 to communicate with the interior of the connection tube, and a suction nozzle 21 for sucking the air containing foreign materials from a floor by means of a suction force generated in the main body 10.

Further, in the main body 10 is installed a dust collecting unit 11 which is detachably mounted to a rear side of the main body. The dust collecting unit 11 causes the air sucked from the suction nozzle 21 to be introduced therein and then the dust and dirt in the air to be collected in a cyclonic fashion. Further, at one side of the main body 10 is formed a discharge portion 19 for discharging the air, from which the foreign materials are filtered out through the dust collecting unit 11, to the atmosphere.

A pair of wheels 18 for traveling the main body 10 on the floor are rotatably installed on a lower surface of the main body 10. Further, a power cord 16 for supplying the vacuum cleaner with electric power is installed at another side of the main body 10. The power cord 16 can be wound around a cord reel (not shown) in the main body and stored in the main body.

The dust collecting unit 11 includes a grip 12 for allowing a user to hold the unit when it is rearward mounted to or demounted from the main body 10. Further, a handle 14, which the user can grip when intending to carry the vacuum cleaner, is installed at a top surface of the main body 10.

In the dust collecting unit 11, an additional fine filter (not shown) can be mounted as a secondary dust collecting means for filtering out fine dust and dirt which remain after a primary cyclonic dust collecting process has been performed. As the vacuum cleaner is repeatedly used for a long time, fine dust and dirt are continuously accumulated in the, fine filter. Therefore, there is inconvenience in that the accumulated dust and dirt should be repeatedly cleaned.

Further, there is a problem in that if the fine dust and dirt are continuously accumulated in the fine filter, the filter should be frequently replaced with a new one.

SUMMARY OF THE INVENTION

The present invention is conceived to solve the aforementioned problems in the prior art. Accordingly, an object of the present invention is to provide a filter assembly for a vacuum cleaner, capable of easily removing dust and dirt accumulated in a filter during in the process of filtering the fine dust contained in air.

Another object of the present invention is to provide a filter assembly for a vacuum cleaner of which a fine filter can be semi-permanently used.

According to an aspect of the present invention for achieving the objects, there is provided a filter assembly for a vacuum cleaner, comprising a primary filter for filtering out fine dust contained in air from which relatively large dust has been separated in a cyclonic manner, a filter case with the primary filter attached to an outer periphery thereof and a plurality of air vent holes formed on the outer periphery thereof, and a secondary filter mounted into the filter case for filtering out again fine dust contained in the air which has passed through the primary filter.

According to another aspect of the present invention, there is provided a filter assembly for a vacuum cleaner, comprising a primary filter for filtering out fine dust and dirt contained in sucked air, a filter case with the primary filter attached to an outer periphery thereof and a plurality of air vent holes formed on the outer periphery thereof, a secondary filter mounted into the filter case for filtering out again fine dust contained in the air which has passed through the primary filter, wherein the secondary filter is a pleated filter made of a flexible material.

According to a further aspect of the present invention, there is provided a filter assembly for a vacuum cleaner, comprising a primary filter for filtering out fine dust and dirt contained in sucked air, a filter case with the primary filter attached to an outer periphery thereof and a plurality of air vent holes formed on the outer periphery thereof, a secondary filter mounted into the filter case for filtering out again fine dust contained in the air which has passed through the primary filter, wherein the filter case is provided with a closed surface, through which the air does not pass, at a portion of the outer periphery.

According to a still further aspect of the present invention, there is provided a dust collecting unit for a vacuum cleaner, comprising a dust collecting casing in which an air inlet and an air outlet are formed, and a filter assembly which is mounted to the dust collecting casing and includes a primary filter for filtering out fine dust and dirt contained in sucked air and a secondary filter for filtering out again fine dust contained in air which has passed through the primary filter.

According to the filter assembly of the present invention so constructed, there are advantages in that the filter cleaning operation can be quickly and conveniently performed and life of the filter can be prolonged.

BRIEF DESCRIPTION OF THE DRAWINGS

The above and other objects, features and advantages of the present invention will become apparent from the following description of a preferred embodiment given in conjunction with the accompanying drawings, in which.

DETAILED DESCRIPTION OF THE PREFERRED EMBODIMENT

Hereinafter, preferred embodiments of a dust collecting unit for a vacuum cleaner according to the present invention will be described in detail with reference to the accompanying drawings. Throughout the drawings, like reference numerals are used to designate like elements.

Figure 2:
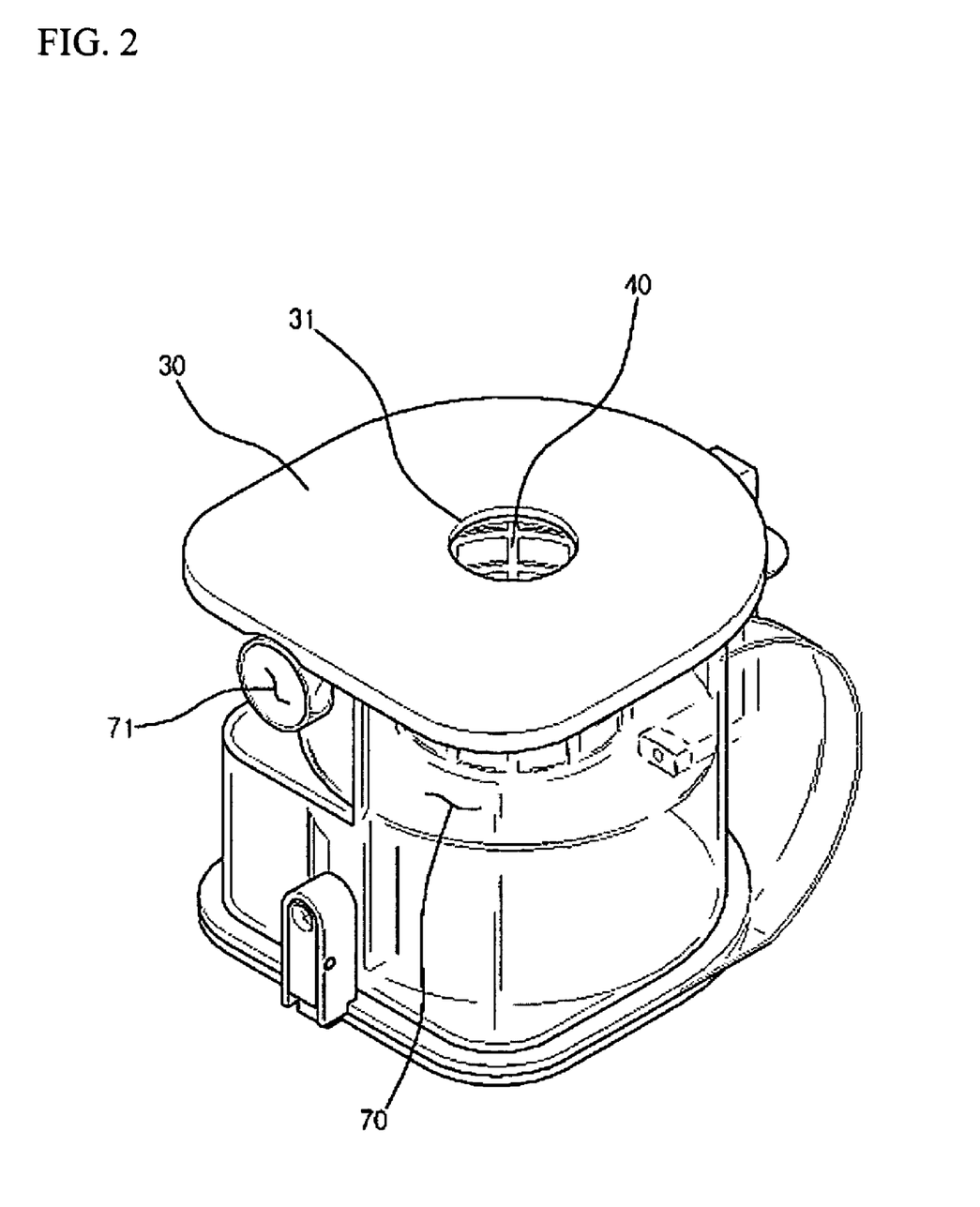
FIG. 2 is a front perspective view of a dust collecting unit for a cyclonic vacuum cleaner according to the present invention.
Figure 3:
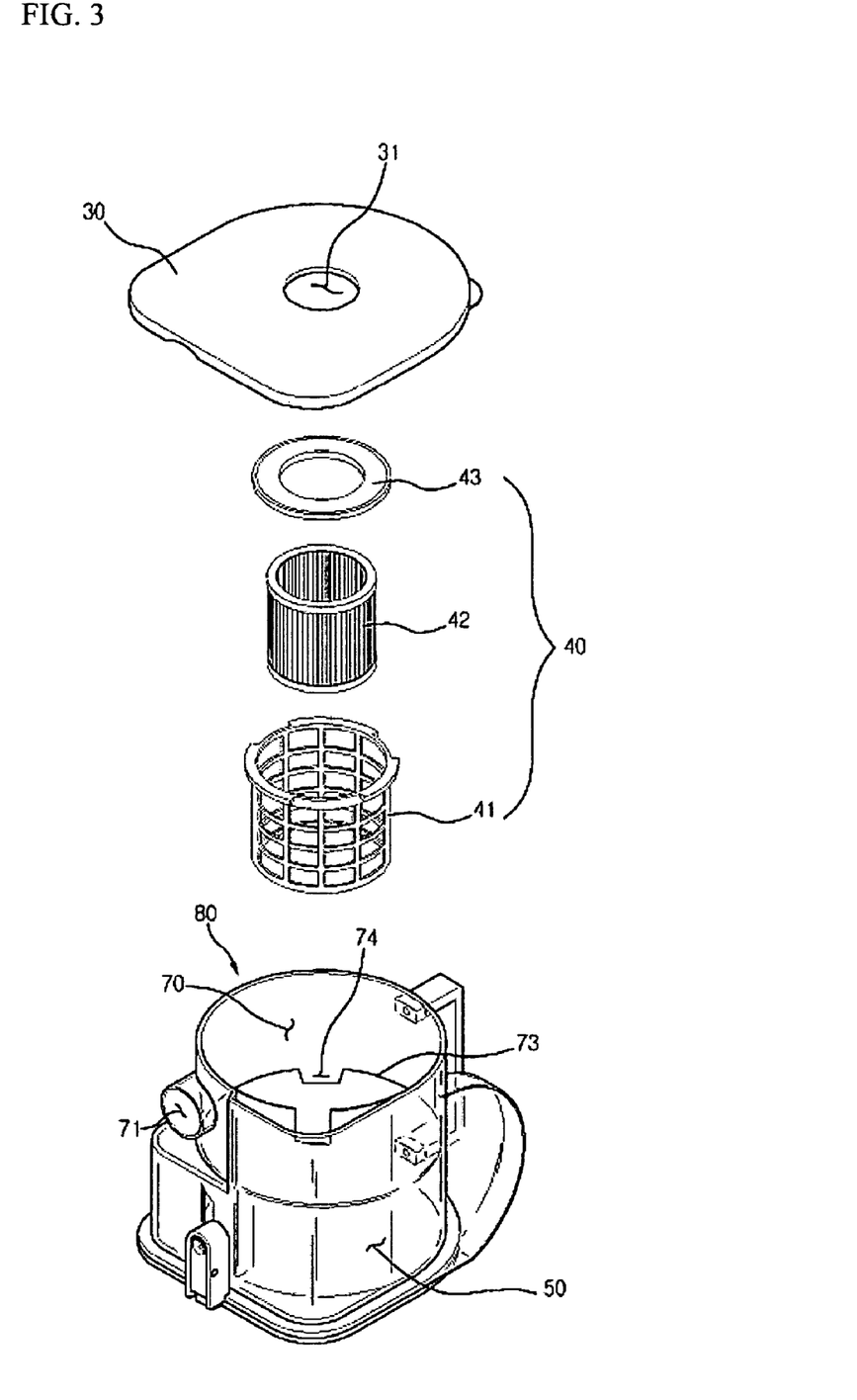
FIG. 3 is an exploded perspective view of the dust collecting unit for the cyclonic vacuum cleaner according to the present invention.

FIG. 2 is a front perspective view of a dust collecting unit of a cyclonic vacuum cleaner according to the present invention, and FIG. 3 is an exploded perspective view of the dust collecting unit of the cyclonic vacuum cleaner according to the present invention.

Referring to FIGS. 2 and 3, the vacuum cleaner of the present invention comprises a cover 30 for covering an upper end of the dust collecting unit 11 to protect inner parts and hermetically sealing the unit to prevent sucked air from leaking out, a filter assembly 40 installed downward from the cover 30 around an outlet 31 formed near the center of the cover, and a dust collecting casing 80 attached to a bottom side of the cover 30.

More specifically, near the center of the cover 30 is formed the outlet 31 through which clean air with dust and dirt filtered out from the air sucked in the dust collecting casing 80 is discharged. The filter assembly 40 in which a fine filtering structure is implemented is positioned below the outlet 31 to filter out fine particles. The filter assembly 40 is cylindrical and is formed with the fine filtering structure on an outer periphery thereof. The air flowing into the filter assembly 40 is filtrated by the filter assembly 40 and then discharged to the outside through the outlet 31.

Further, the dust collecting casing 80 comprises an inlet 71 through which air is introduced from the main body of the vacuum cleaner into the dust collecting unit, a cylindrical dust separation chamber 70 in which the air sucked through the inlet 71 swirls by a centrifugal force and the dust and dirt are separated from the air by their own weight, and a main dust collecting chamber 50 which is defined in the dust separation chamber 70 below a dust separating plate 73 SO that the dust and dirt dropped by their own weight are accumulated in the dust collecting chamber through a predetermined opening 74.

More specifically, the filter assembly 40 comprises a filter casing 41 with a plurality of holes formed on an outer periphery thereof and a large air discharge opening formed at an upper end thereof, a pleated filter 42 mounted into the filter casing 41, and a filter cover 43 which is attached to the upper end of the filter casing 41 to allow the filter casing 41 to be fixed to a bottom surface of the cover 30.

The filter assembly 40 will be operated in such a manner that fine dust is filtered out by the pleated filter 42 after relatively large dust has been filtered out while the air containing the dust swirls in the dust separating chamber 70, and the clean air from which the fine dust has been separated by the pleated filter 42 is discharged to the outside through the outlet 31.

Figure 4:
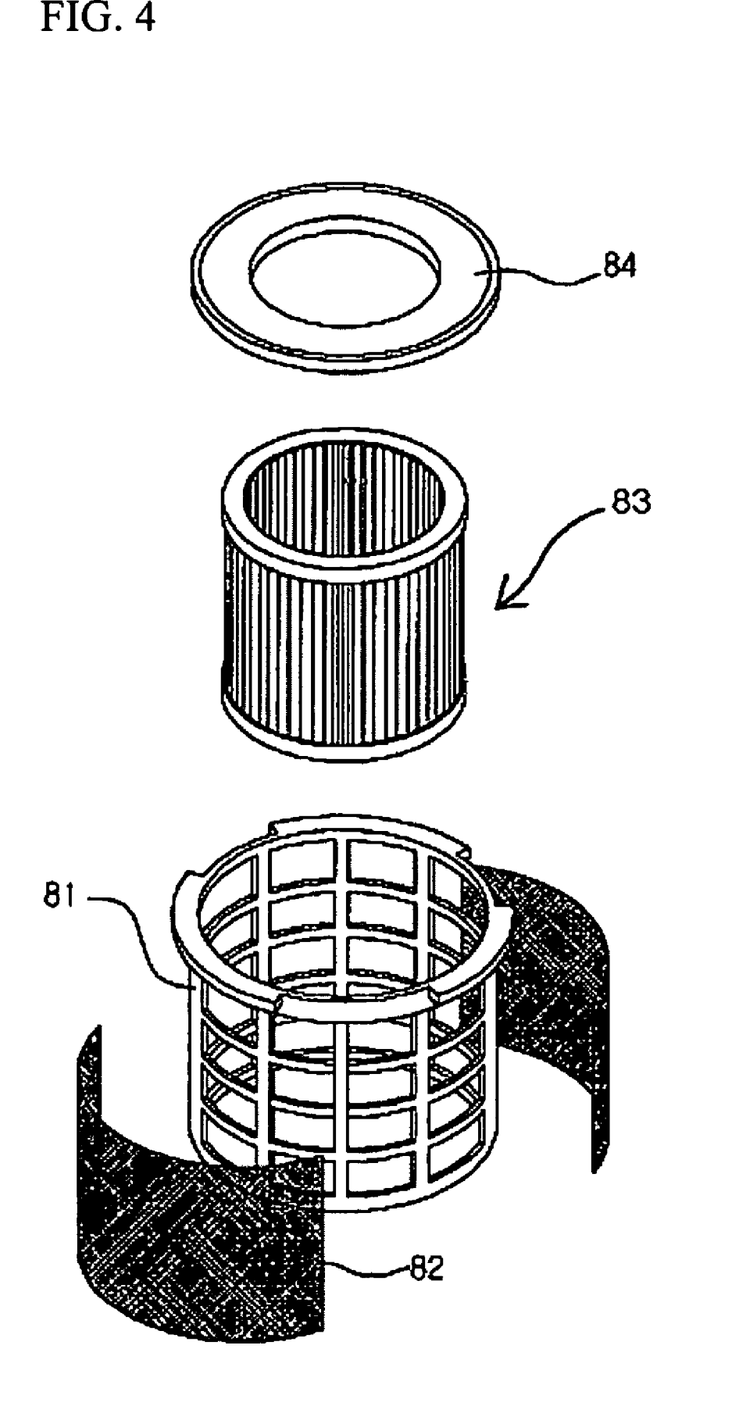
FIG. 4 is an exploded perspective view of a filter assembly for the vacuum cleaner according to an embodiment of the present invention.

FIG. 4 is an exploded perspective view of the filter assembly for a vacuum cleaner according to a preferred embodiment of the present invention. Referring to FIG. 4, the filter assembly 40 comprises a cylindrical filter case 81 with a plurality of air vent holes formed on an outer periphery thereof, a fine filter 82 attached to the outer periphery of the filter case 81, a pleated filter 83 mounted into the filter case 81, and a filter cover 84 attached to an upper end of the filter case 81.

More specifically, a lower end of the filter case 81 is closed whereas the upper end thereof is opened to allow air to be discharged to the outside. However, the positions of air vent holes and air discharge opening of the filter casing 81 may vary according to a specific shape of the dust collecting unit for filtering out the relative large dust.

Further, the fine filter 82 is a mesh filter for finely filtering out the fine dust after the relatively large dust has been filtered out by the cyclonic operation. The dust to be filtered generally adheres to an outer surface of the fine filter 82. Furthermore, it is preferred that the fine filter 82 be attached to the outer periphery of the filter case 81 using an adhesive. Moreover, the fine filter 82 may be attached either to the whole outer periphery of the filter case 81 or to only specific regions of the filter case using the adhesive in order to prevent the fine holes thereof from being blocked while the fine filter 82 is mounted to the filter case 81.

In this embodiment, the fine filter 82 and the pleated filter 83 function as primary and secondary filters, respectively. Thus, the filter assembly with the two filters can provide the dust collecting unit with a dual filtering function in addition to the cyclonic dust collection function.

The pleated filter 83 can be fitted and securely seated into the filter case 81, and it can also easily detach from the filter case 81 when a user wishes to remove the dust and dirt therefrom. The filter cover 84 is used to attach the filter assembly 40 to the dust collecting unit 11. A specific shape, structure and arrangement of the filter cover 84 can vary according to a specific structure and shape of the dust collecting unit.

Hereinafter, an operation of the aforementioned filter assembly for the dust collecting unit will be described.

The relatively large dust is filtered by a cyclonic swirling phenomenon generated in the dust collecting unit, and then, only fine dust remains in the air. Such fine dust is first filtered by the fine filter 82. That is, the fine dust contained in the air is first filtered out to a nearly perfect level.

Further, the fine dust that has not yet been filtered by the fine filter 82 is perfectly filtered by the pleated filter 83 and then discharged through the opening formed at the upper end of the filter assembly 40.

At this time, since the dust filtered by the fine filter 82 adheres to the outer surface of the fine filter 82, the fine filter 82 can be more easily cleaned as compared with in the prior art.

In addition, since the fine dust is primarily filtered by the fine filter 82, an amount of the fine dust to be accumulated on the pleated filter 83 is considerably reduced, and thus, life and cleaning period of the pleated filter can be remarkably prolonged.

Figure 5:
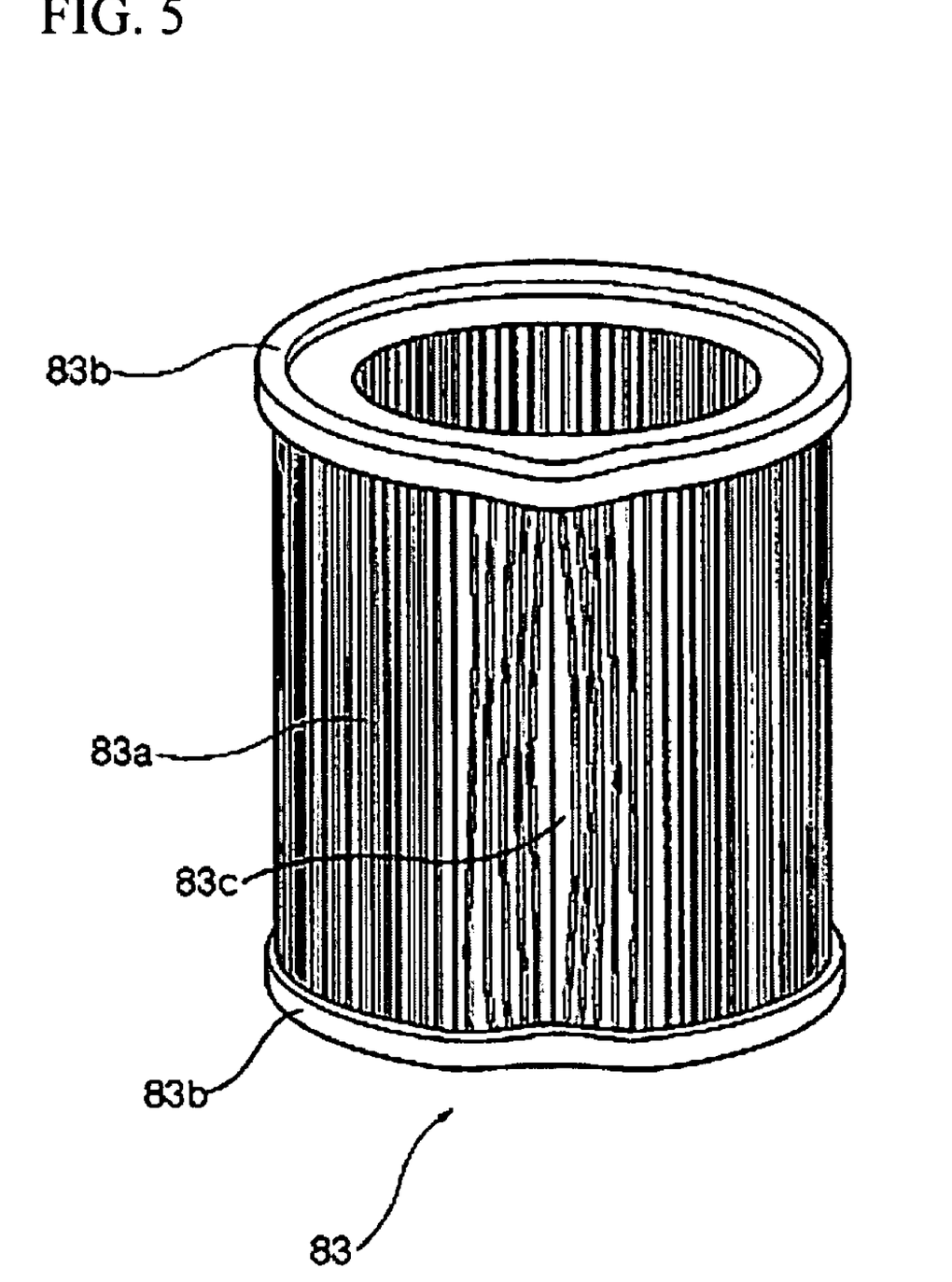
FIG. 5 is a perspective view of a preferred embodiment of the filter assembly according to the present invention.

FIG. 5 shows a preferred example of the pleated filter. In this example, the pleated filter 83 comprises pleated portions 83a that are closely pleated several times to increase a surface area to be contacted with the dust, and flexible fixing portions 83b for fixing upper and lower ends of the pleated portions 83a. It is preferred that the pleated portions 83a be generally made of a vulcanized fiber etc. so that it can be prevented from being easily deformed by a suction force of a motor (not shown) and can also be washed with water for its semi-permanent use.

The flexible fixing portions 83b are made of rubber or urethane such that their shapes can be flexibly changed in accordance with an external pressure. The flexible fixing portions 83b are attached to the upper and lower ends of the pleated portions 83a, respectively, so that the pleated portions 83a can be maintained to their specific shapes. Desired regions of the pleated portions 83a may become relatively widened by modifying the flexible fixing portions 83b according to a desired shape as shown in this figure.

As described above, since the desired regions of the pleated portions 83a can be widened by the flexible fixing portions 83b, the dust held between the widened pleated portions 83c can be easily removed using a brush, etc.

Figure 6:
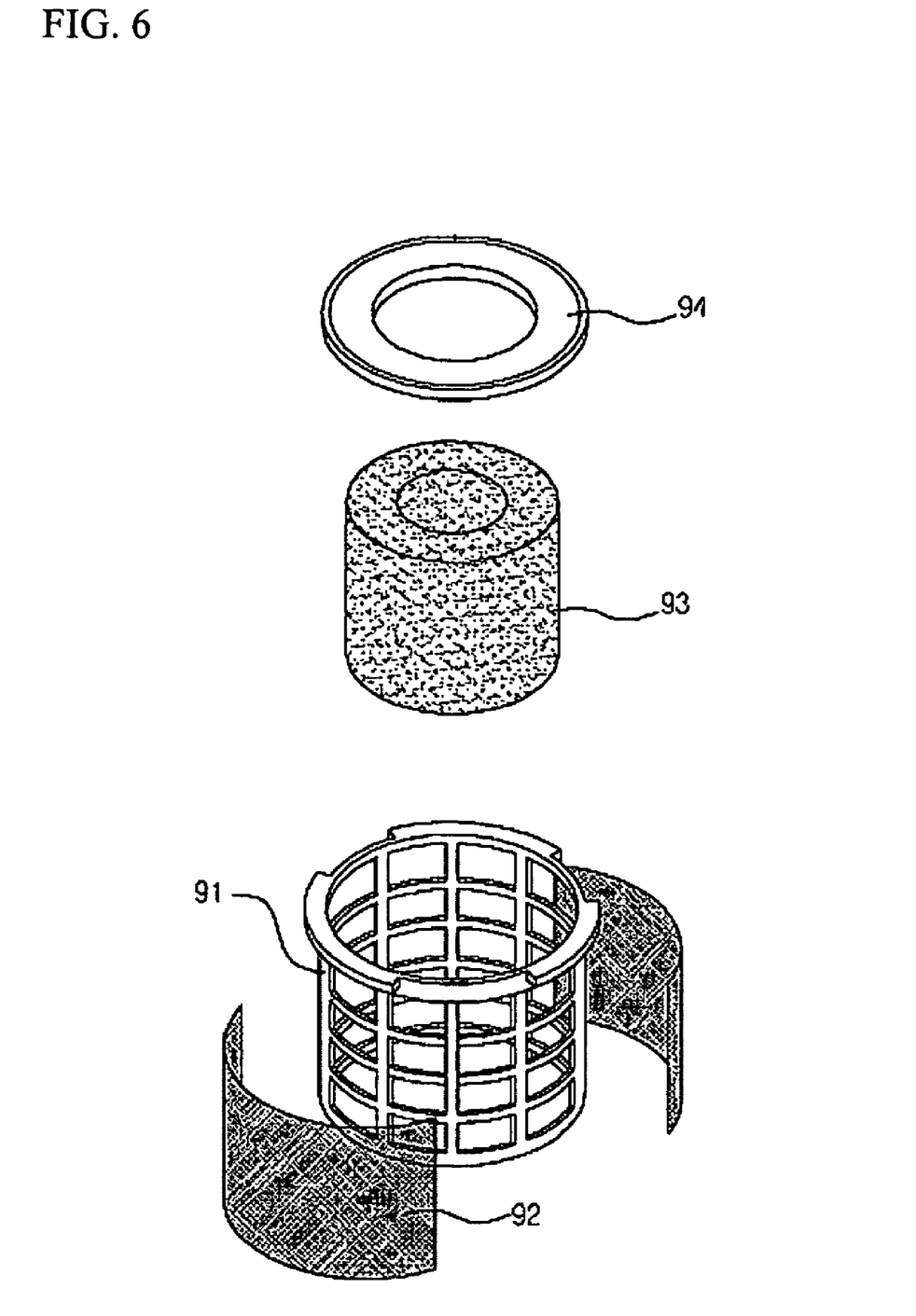
FIG. 6 is an exploded perspective view of a filter assembly for the vacuum cleaner according to another embodiment of the present invention.

FIG. 6 is an exploded perspective view of a filter assembly for a vacuum cleaner according to another preferred embodiment of the present invention.

As shown in FIG. 6, the filter assembly of this embodiment is identical with the aforementioned embodiment in many respects. That is, a fine filter 92, a filter case 91 and a filter cover 94 of this embodiment are the same as those of the aforementioned embodiment, except that the pleated filter 83 is replaced with a porous filter 93 in this embodiment. As an example of the porous filter 93, sponge or the like may be used. The porous filter 93 is generally made of a resin in which a plurality of holes are formed to filter out the dust.

Similarly to the aforementioned embodiment, the fine dust and dirt that has not yet been filtered by the fine filter 92 can also be perfectly filtered by the porous filter 93.

In the meantime, so long as the secondary filters, i.e. porous filter 93 and the pleated filter 83, can clearly filtrate the air that was already filtered by the fine filter 92 and 82, any shapes of secondary filters can be used in the filter assembly regardless of the kinds thereof.

In this embodiment, the fine dust and dirt adhering to the surface of the fine filter 92 can be easily cleaned or washed, and the life of the porous filter 93 can also be prolonged since a large amount of the dust and dirt is not accumulated in the porous filter 93 due to the fine filter 92.

Figure 7:
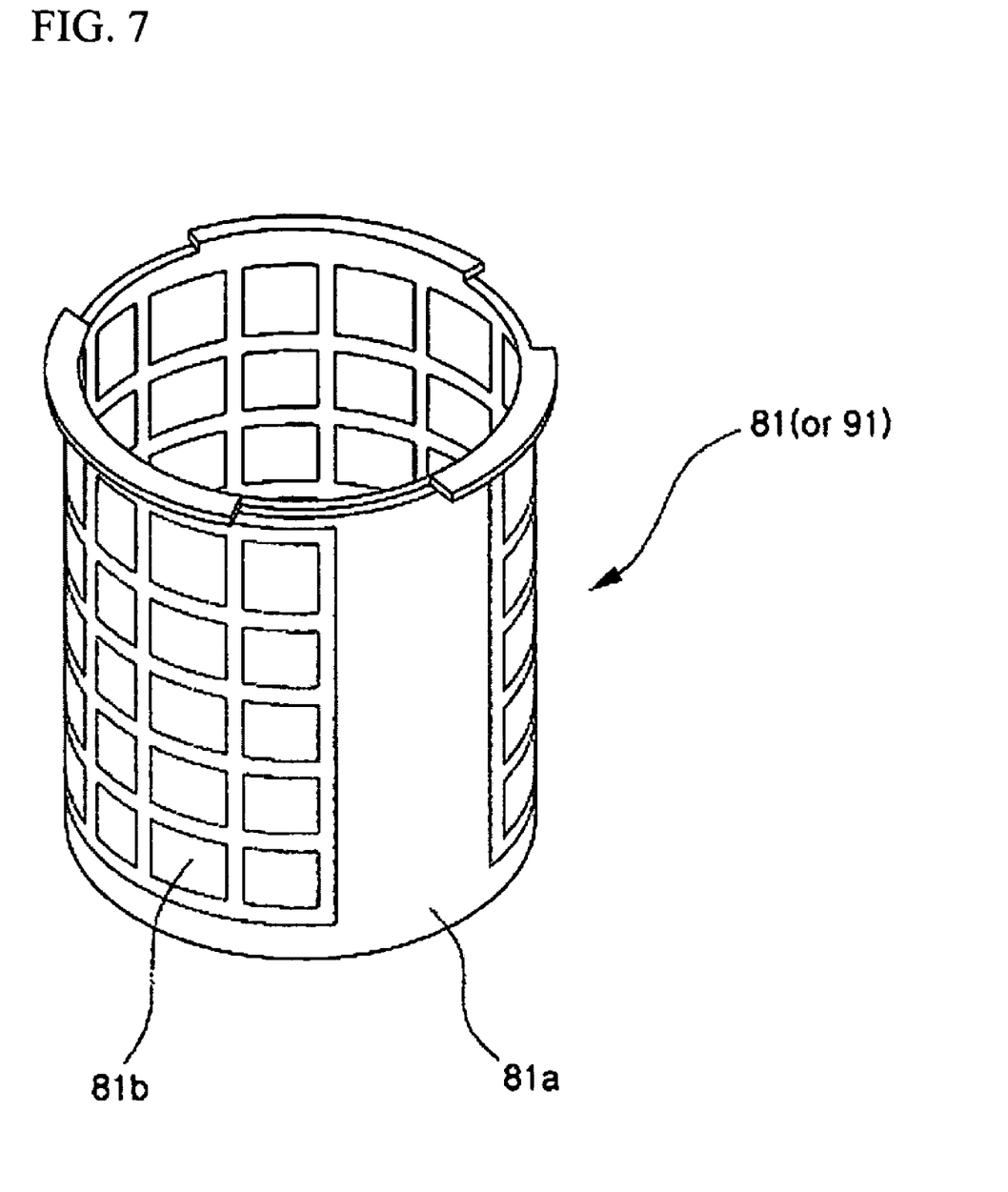
FIG. 7 is a perspective view showing a modified shape of a filter case according to the present invention.

FIG. 7 is a perspective view showing a modified example of the filter case 81 or 91. Any one of the filter cases 81 and 91 is installed at the center of the dust collecting casing 80, and the air sucked from the inlet 71 swirls around the filter case in a cyclonic manner. In this example, a portion of the filter case is formed with a closed structure through which air does not pass. That is, a plurality of openings 81b serving as air vent holes are formed at a portion of the outer periphery of the filter case, whereas a closed surface 81a with no openings is formed at the other portion of the outer periphery of the filter case.

If the filter case so constructed is installed such that the flow of air introduced from the inlet 71 of the dust collecting casing 80 is directed to the closed surface 81a, it is possible to prevent the introduced air from directly flowing into the filter assembly 40 without the cyclonic dust collection during the swirling process of the introduced air. Therefore, dust collection efficiency of the vacuum cleaner can be further maximized.

The present invention can be applied to various types of the vacuum cleaners, and particularly, to the cyclonic vacuum cleaner so that convenience of use can be further improved.

According to the present invention, there is an advantage in that it is possible to easily remove the dust and dirt accumulated in the filter assembly during the process of filtering the fine dust contained in the air. Further, the expected life span of the filter assembly can be more prolonged because the fine filter can be used semi-permanently. Furthermore, the cleaning efficiency of the vacuum cleaner can also be improved due to the dual filtering function in addition to the cyclonic dust collection of the dust collection unit.

Although the present invention has been described in connection with the preferred embodiments thereof shown in the accompanying drawings, it is a mere example of the present invention. It can also be understood by those skilled in the art that various changes and modifications thereof can be made thereto without departing from the scope and spirit of the present invention defined by the claims. Therefore, the true scope of the present invention should be defined by the technical spirit of the appended claims.

What is claimed is:

1. A filter assembly for a vacuum cleaner, comprising:
   a filter case comprising a substantially cylindrical hollow main body having a plurality of holes formed in an outer peripheral surface thereof;
   a primary filter that comprises a mesh that is removably coupled to the outer peripheral surface of the filter case so as to across the plurality of holes formed in the filter case and also across a closed portion of the outer peripheral surface of the filter case, wherein the primary filter filters particles from air passing therethrough; and
   a secondary filter provided in the hollow main body, wherein the secondary filter filters particles from air which has passed through the primary filter, and wherein the secondary filter is a pleated filter, and wherein the pleated filter comprises:
   a plurality of pleated portions that increase a surface area of the filter; and
   a pair of flexible fixing portions provided at upper and lower ends of the plurality of pleated portions.

2. The filter assembly as claimed in claim 1, further comprising a filter cover provided at an upper end or a lower end of the filter case.

3. The filter assembly as claimed in claim 1, wherein the outer peripheral surface of the filter case includes open portions where the plurality of holes are formed, and closed portions through which air does not pass.

4. The filter assembly as claimed in claim 1, wherein the primary filter, the secondary filter and the main body are all substantially cylindrical and concentrically aligned.

5. The filter assembly as claimed in claim 4, wherein the plurality of holes cause air to be drawn radially inward through the primary filter, through the plurality of holes and through the secondary filter to a central area of the filter assembly for discharge through an oudet formed in a cover of the filter assembly.

6. The filter assembly as claimed in claim 1, wherein the flexible fixing portions are configured to flex when the secondary filter is removed from the filter case so as to allow the plurality of pleated portions to expand. a filter cover provided at an upper end or a lower end of the filter case 7. The filter assembly as claimed in claim 1, wherein the secondary filter receives filtered air which has been filtered by and passed through the primary filter, and filters remaining particles out of the air received from the primary filter.

8. A filter assembly for a vacuum cleaner, comprising:
   a filter case having a plurality of holes formed in an outer peripheral surface thereof;

a primary filter that surrounds and is removably coupled to the outer peripheral surface of the filter case; and a secondary filter provided within the filter case, wherein the secondary filter filters particles from air which has passed through the primary filter, wherein the secondary filter is a pleated filter made of a flexible material, and wherein the secondary filter comprises:

a plurality of pleated portions that increase a surface area of the filter; and a pair of flexible fixing portions provided at upper and lower ends of the plurality of pleated portions.

9. The filter assembly as claimed in claim 8, wherein the case, the primary filter and the secondary filter are all substantially cylindrical and concentrically aligned.

10. The filter assembly as claimed in claim 8, wherein the primary filter is a flat mesh material that extends around the outer peripheral surface of the filter case to filter particles from air passing therethrough.

11. The filter assembly as claimed in claim 8, wherein the plurality of holes cause air to be drawn radially inward through the primary filter, through the plurality of holes and through the secondary filter to a central area of the filter assembly for discharge through an outlet formed in a cover of the filter assembly.

12. A filter assembly for a vacuum cleaner, comprising:

a filter case having a plurality of holes that allow air to pass therethrough and a plurality of closed portions through which air does not pass formed in an outer peripheral surface thereof;

a primary filter that surrounds and is removably coupled to the outer peripheral surface of the filter case; and a secondary filter provided within the filter case, wherein the secondary filter filters particles from air which has passed through the primary filter, wherein the secondary filter is a pleated filter made of a flexible material, and wherein the secondary filter comprises:

a plurality of pleated portions that increase a surface area of the filter; and a pair of flexible fixing portions provided at upper and lower ends of the plurality of pleated portions.

13. A dust collecting unit for a vacuum cleaner, comprising:

a dust collecting casing having air inlet and an air outlet; and a filter assembly provided within the dust collecting casing, wherein the filter assembly includes;

a filter case;

a primary filter removably coupled to the case so as to surround an outer peripheral surface of the filter case, wherein the primary filter filters out particles from air in the dust collecting casing; and a secondary filter that filters particles from air which has passed through the primary filter, wherein the secondary filter is a pleated filter that includes a plurality of pleated portions that increase a surface area of the secondary filter, and a pair of flexible fixing portions provided at upper and lower ends of the plurality of pleated portions.

14. The dust collecting unit as claimed in claim 13, wherein the primary filter extends across a plurality of holes formed in the outer peripheral surface of the filter case, and wherein the secondary filter positioned within an inner periphery of the filter case.

15. The dust collecting unit as claimed in claim 14, wherein the filter assembly includes a filter cover coupled to an upper end or a lower end of the filter case.

16. The dust collecting unit as claimed in claim 14, wherein the outer peripheral surface of the filter case, also includes a closed portion through which the air does not pass.

17. The dust collecting unit as claimed in claim 13, further comprising a cover having an opening through which filtered air is discharged, wherein the filter assembly is removably coupled to the cover.

* * * * *